Dec. 18, 1956  L. D. KORYTA  2,774,701
METHOD OF BONDING RUBBER TO METAL AND THE RESULTING ARTICLE
Filed July 16, 1956
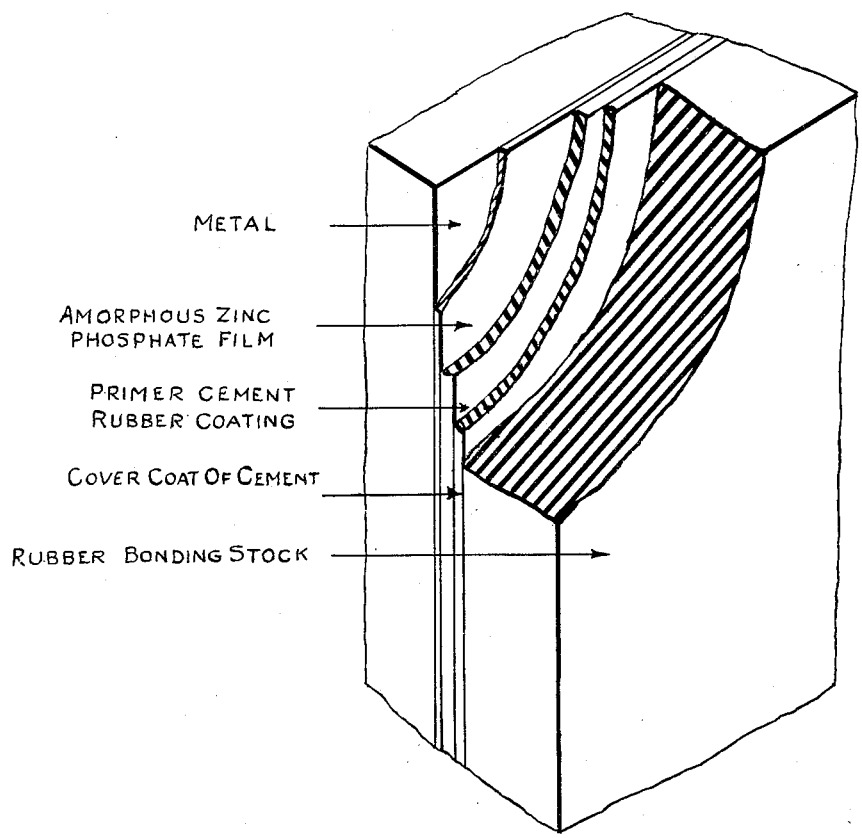
INVENTOR
LEONARD D. KORYTA

United States Patent Office 2,774,701
Patented Dec. 18, 1956

2,774,701

METHOD OF BONDING RUBBER TO METAL AND THE RESULTING ARTICLE

Leonard D. Koryta, Parma, Ohio, assignor to Richard C. Weiss, Cleveland, Ohio, as trustee Application July 16, 1956, Serial No. 597,964

2 Claims. (Cl. 154—130)

The present invention relates to rubber-coated metal products and to a new and improved method of bonding rubber to metal objects.

It is an object of the present invention to provide a new and improved method of bonding rubber to metal objects whereby a bond is produced having increased strength and other improved properties.

It is a further object to provide a new and improved bond between rubber and metal which is accomplished by providing an amorphous coating on the surface of the metal to which the rubber is bonded.

Still other objects and advantages will be apparent to those skilled in the art to which this invention relates from the following description of the invention and the accompanying drawing.

The drawing illustrates a metal article having rubber bonded thereto wherein a metal backing has an amorphous zinc phosphate film on the surface thereof. On this is applied an intermediate coating of a rubber cement to vulcanize the commercial rubber bonding stock attached thereto.

As indicated above, the present invention relates to rubber-metal laminated products and, more specifically, to a new and improved method of effecting a bond or cohesive union between rubber and metal. Prior to the present invention, several methods have been used for preparing the surfaces of metal to which rubber is to be bonded. One such method was to shot-blast the surface in order to get a suitable surface which the rubber would cling to. Tests show that the surfaces of metal must not be too smooth or too rough in order to effect the best bond. Shot-blasting has been an accepted method of accomplishing this result since it can be used to roughen articles which are too smooth, and can also be used to smooth the surface of articles which are too rough to effect a satisfactory bond. In either case shot-blasting will produce its characteristic surface.

Another method of providing a suitable surface on metal, particularly with steel articles, has been brass-plating. Brass-plating provides its characteristic texture to the surface and can be used on articles whose surface prior to plating is too rough or too smooth to effect a suitable bond.

I have discovered that a substantially non-crystalline or amorphous coating of a suitable metallic salt or compound provides an ideal surface to which rubber, either natural or synthetic or artificial can be bonded.

Tests show that rubber which has been vulcanized to such a surface tends to tear along the main body of the rubber deposit before breaking the cohesive union or bond at the metal's interface.

By way of example, a substantially non-crystalline or amorphous zinc phosphate coating was applied to a steel supporting strip of an automobile accelerator pedal in the following manner:

1. All grease, oil, etc. was removed from the surface of the article by a conventional vapor degreasing machine.
2. The article was immersed for approximately 30 seconds in a phosphoric acid bath having a temperature of 150–170° F., for the purpose of removing rust, mill scale, etc. The bath was made by mixing 1600 lbs. of 75% orthophosphoric acid with 1000 gallons of water.
3. The article was given a rinse in cold running water for approximately 3 minutes.
4. It was then immersed in a zinc phosphating bath of the type which contains modifiers which modify and inhibit crystalline growth. The specific bath used was approximately a 4% by volume solution of Meta Bond #14 in water. The temperature of the bath was held at about 200° F. and the part was immersed for approximately 7 minutes. "Meta Bond #14" has a specific gravity of approximately 1.583 and is a trade-name for a commercial product of the International Rustproof Corporation whose composition may vary but which analysis shows to be approximately as follows:

| Radical: | Percent by weight |
|---|---|
| Zn | 9.92 |
| Fe | Less than 1.0 |
| Al | Less than 1.0 |
| Ca | 5.35 |
| $NH_4$ | 1.33 |
| $NO_3$ | 16.20 |
| Cl | 5.19 |
| Total $PO_4$ | 18.91 |
| Water | Balance |
| Free $H_3PO_4$ | 9.90 |

5. The article was then given a rinse in cold running water for 3 minutes.
6. The article was then immersed for approximately 30 seconds in a chromic acid bath made by dissolving 5 lbs. of chromic acid flake in 1000 gallons of water.
7. The article was then air-dried.

The coating obtained by the above process appeared relatively hard, smooth and uniform, did not dust and was not easily removed, and showed no crystalline structure when observed under 100 diameter magnification.

8. The article was then coated with a rubber compatible adhesive, as for example Typly Up, a chlorinated rubber cement made by the Marbon Products Company, of Gary, Indiana, or as another example, a coating of Loxite 3000, a synthetic rubber cement made as disclosed in U. S. Patent No. 2,581,920, a cement manufactured by the Xylos Rubber Company, of Akron, Ohio. All of these adhesives may be diluted with toluene or xylene.
9. The article was then air-dried and a second coating applied, such as Braze a GRS synthetic cement made by the Vanderbilt Company of New York, N. Y. This was also air-dried.
10. The article was placed in a mold with commercial grade rubber bonding stock and vulcanized at a temperature of 315° to 320° F. for approximately 25 to 35 minutes, or at a temperature of 330 to 335° F. for 8 minutes, that is, until the rubber is bonded to the steel body.

The composite rubber-coated steel product thus formed exhibited an amazing bond strength. When tested, it was found that the vulcanized rubber-coating would tear before it could be separated at the treated metal's surface. Previous to the present invention, the accelerator bodies had been given a zinc phosphate coating which did not contain the above referred to modifiers and which produced a crystalline structure on the surface of the metal. Rubber bonded to such articles in the exact same manner as outlined above could usually be removed from the articles at the metal interface.

The exact reasons why the amorphous non-crystalline structure produces the result which it does is not known. One theory is that the characteristic structure of an amorphous coating does not have a porous texture that will retain air when the fluid rubber flows around the metal. Another theory is that there are no sharp crystalline edges to produce stress concentrations in the rubber at the rubber's interface.

The procedure used in the example above for degreasing the metal surface, depositing the amorphous coating, and for its subsquent acid bath are not rigid steps which must be followed. The degreasing step can be accomplished by any suitable means including an alkali bath, the phosphoric acid bath can be skipped if there is no rust or mill scale, and the chromic acid bath is not essential. The amorphous coating has been applied to other metals, including commercial pot metal, with equally good results.

For the purposes of this disclosure the words "substantially non-crystalline" and "substantially amorphous" shall be construed to mean molecular arrangements which either do not have crystalline structure, or which if they do have crystalline structures, are of such minute crystalline size that for all intents and purposes its crystalline structure does not affect the above described process.

This application is a continuation-in-part of application Serial No. 428,835, filed May 10, 1954, now abandoned.

The invention is not limited to the preferred materials or practice, which has been given merely for illustrative purposes, but may be otherwise embodied or practiced within the scope of the following claims.

What is claimed is:

1. The process comprising treating a steel object with a solution which produces a hard amorphous coating of zinc phosphate on the surface of the object, coating the surface with an adhesive compatible with rubber, placing the object so prepared into a mold along with rubber to be applied to the object and applying sufficient heat thereto to polymerize the adhesive and bond the rubber to the object.

2. The process comprising treating a steel object with a solution comprising zinc ions, phosphate ions, and a modifier which inhibits the formation of crystalline zinc phosphate, to form an amorphous coating on the steel which does not display crystalline structure at a magnification of 100 diameters and which consists principally of zinc phosphate, drying the object, coating the object with a rubber cement, placing the object thus prepared into a mold along with rubber to be applied to the object, heating the rubber and rubber cement at a sufficiently high temperature to melt the rubber and polymerize the rubber cement whereby the rubber is bonded to the object.

References Cited in the file of this patent

UNITED STATES PATENTS

| | | |
|---|---|---|
| Re. 24,017 | Henricks | June 7, 1955 |
| 2,293,716 | Darsey | Aug. 25, 1942 |
| 2,314,565 | Thomson | Mar. 23, 1943 |
| 2,336,388 | Beebe | Dec. 7, 1943 |
| 2,382,081 | Luaces et al. | Aug. 14, 1945 |